United States Patent [19]

Kratt et al.

[11] Patent Number: 4,721,281

[45] Date of Patent: Jan. 26, 1988

[54] ACTUATING DEVICE FOR THROTTLE VALVE

[75] Inventors: Alfred Kratt, Trossingen; Hermann Nusser, Markgröningen; Gunther Plapp, Filderstadt; Helmut Schwarz, Backnang, all of Fed. Rep. of Germany

[73] Assignee: Robert Bosch GmbH, Stuttgart, Fed. Rep. of Germany

[21] Appl. No.: 30,190

[22] Filed: Mar. 26, 1987

[30] Foreign Application Priority Data

Jul. 25, 1986 [DE] Fed. Rep. of Germany ....... 3625282

[51] Int. Cl.$^4$ .............................................. G05G 7/14
[52] U.S. Cl. .......................................... 251/54; 74/513; 123/400; 251/78; 251/129.03; 251/285
[58] Field of Search ................. 251/54, 78, 285, 287, 251/129.03; 74/513; 123/400, 403

[56] References Cited

U.S. PATENT DOCUMENTS

| | | | |
|---|---|---|---|
| 2,065,167 | 12/1936 | Wirth et al. | 251/78 |
| 2,179,788 | 11/1939 | Hinton et al. | 251/54 |
| 3,757,611 | 9/1973 | Buck | 251/285 X |
| 3,943,907 | 3/1976 | Kluth | 74/513 X |
| 4,411,845 | 10/1983 | Tanahashi et al. | 74/513 X |
| 4,579,017 | 4/1986 | Nusser . | |
| 4,616,518 | 10/1986 | Nusser . | |

FOREIGN PATENT DOCUMENTS 1127723 4/1962 Fed. Rep. of Germany ........ 251/54

Primary Examiner—Martin P. Schwadron
Assistant Examiner—Stephen M. Hepperle
Attorney, Agent, or Firm—Edwin E. Greigg

[57] ABSTRACT

An actuating device is proposed which is used to adjust a throttle valve disposed in the intake tube of an internal combustion engine. The actuating device includes a gas pedal adapted to engage an actuating lever, which is supported rotatably relative to a throttle valve shaft, so as to pivot counter to the force of a restoring spring. Connected to the actuating lever is a follow-up drawing spring, which is secured with one end to an intermediate lever provided with a cam disk having a curved camming surface which surface a lever arm is supported so as to operate a damper element. The intermediate lever is rotatably supported with respect to the throttle valve shaft and with a coupling stop engages a throttle valve lever, which is connected to the throttle valve shaft such that relative rotation between them is prevented. The throttle valve lever is drawn against the coupling stop by means of an uncoupling spring disposed between the intermediate lever and the throttle valve lever. An idling actuator also engages the throttle valve lever. When the actuating lever is actuated in the clockwise direction, the intermediate lever is drawn in a damped follow-up manner by the follow-up drawing spring to adjust the throttle valve via the throttle valve lever.

3 Claims, 1 Drawing Figure

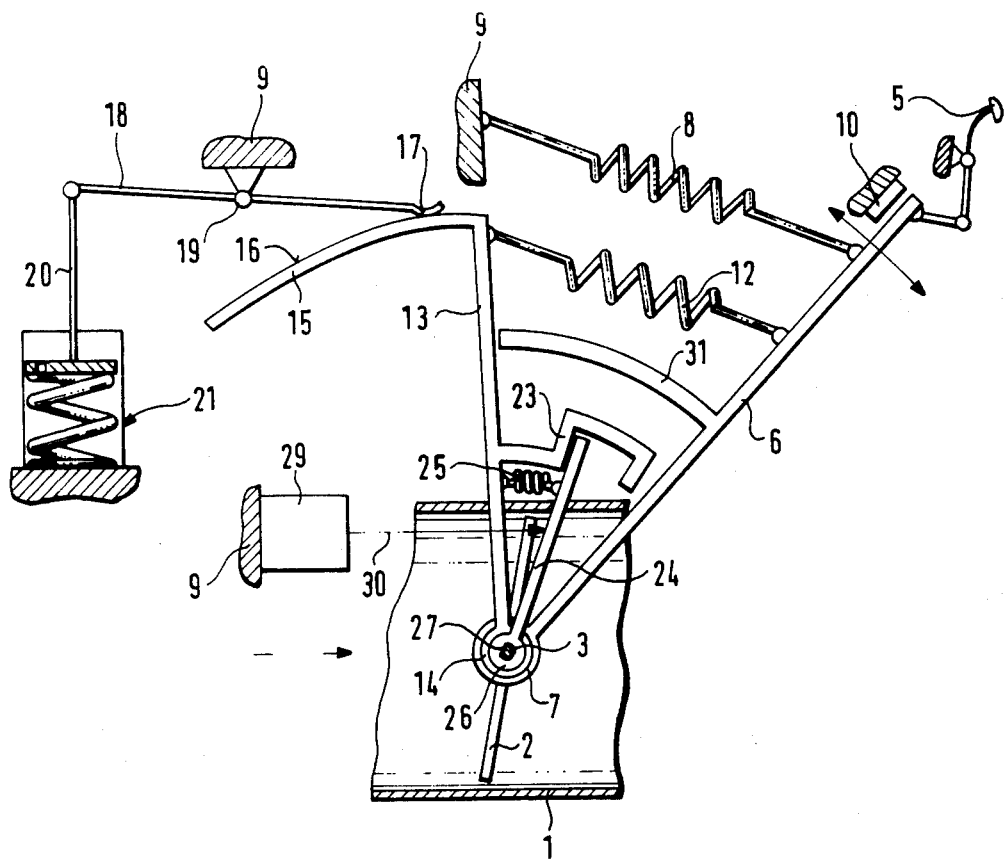

ACTUATING DEVICE FOR THROTTLE VALVE

BACKGROUND OF THE INVENTION

The invention is directed to improvements in an actuating device for a throttle valve. An actuating device is already known in which the damping of the adjustment motion of the throttle valve is performed continuously, so that an idling actuator that actuates the throttle valve for idling control must always work against the damping, action which not only requires more electric current but also causes increased wear.

OBJECT AND SUMMARY OF THE INVENTION

The principal object of the actuating device according to the invention and having the advantage over the prior art is that the force the idling actuator must bring to bear for idling control is limited to a force dependent on the uncoupling spring and is not dependent on the damping action. As a result, the idling actuator needs less current, and there is less danger of wear.

It is particularly advantageous to select the force of the uncoupling spring such that the moment acting upon the intermediate lever by means of the uncoupling spring is greater than the moment generated by the force of the restoring spring upon the actuating lever, so that the intermediate lever is capable of following up the idling actuator adjustment of the throttle valve lever counter to the damping action of the damping element.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in simplified form.

DESCRIPTION OF THE PREFERRED EMBODIMENT

The simplified view in the drawing shows an intake tube 1 of an internal combustion engine, not otherwise shown, by way of which the aspirated air quantity is delivered to the engine and controlled by means of a throttle valve 2 acting as a throttle device. The throttle valve 2 is connected to a throttle valve shaft 3 such that relative rotation between them is prevented and thus the throttle valve is rotatably supported in the intake tube 1. The actuating device of the throttle valve 2 includes a so-called gas pedal 5, which is arbitrarily actuatable and engages a slidingly supported actuating lever 6 which is coaxial with the throttle valve shaft 3 and is slidingly and rotatably supported by means of a hub 7. The actuation of the gas pedal 5 is effected counter to the force of a restoring spring 8 which engages the actuating lever 6 and is embodied for example as a helical spring subject to stretching; it is secured with its other end to the housing 9 of a so-called throttle valve stub. The restoring spring 8 tends to urge the actuating lever 6 against an end stop 10 also formed on the housing 9.

Also connected to the actuating lever 6 is one end of a follow-up drawing spring 12, which may likewise be embodied as a helical spring subject to stretching and the other end of which engages an intermediate lever 13, which is likewise supported coaxially with respect to the throttle valve shaft 3 via a hub 14 and is rotatable relative to this shaft. Secured to the intermediate lever 13 remote from the hub 14 is a cam disk 15, on which a curved path 16 is provided. A feeler end 17 of a lever 18 which for example has two arms is supported on the curved path 16 of the cam disk 15; the fulcrum of the lever 18 is at a pivot point 19, integral with the housing, and the other end of the lever 18 engages an actuating rod 20 of a damper element 21. The damper element may for example be embodied as a known hydraulic damper element.

A coupling stop 23 is also connected to the intermediate lever 13 and a throttle valve lever 24 is pulled against this stop 23 by an uncoupling spring 25, comprising, for example, a helical spring subject to stretching, which has one end secured to the throttle valve lever 24 and the other end secured to the intermediate lever 13. Instead of one uncoupling spring 25, two parallel-connected uncoupling springs could also be provided. Remote from the coupling stop 23, the throttle valve lever 24 is mounted with a hub 26 on the throttle valve shaft 3 and is for example connected to the throttle valve shaft 3 in such a manner, for instance by means of keying or flattened regions 27, that relative rotation between them is prevented. The hubs 7 and 14 of the actuating lever 6 and intermediate lever 13, respectively, are each rotatable relative to one another and relative to the hub 26 of the throttle valve lever 24.

An electromagnetically actuatable so-called idling actuator 29 is disposed integral with the housing 9, and with an actuating rod 30 engages the throttle valve lever 24, so as to open the throttle valve 2 to a greater or lesser extent to attain the required engine idling rpm.

Between the actuating lever 6 and the intermediate lever 13, a spacer 31 is provided, which is for example connected to the actuating lever 6. The uncoupling spring or springs 25 is or are designed such that the moment exerted upon the intermediate lever 13 is greater than the moment exerted on the actuating lever 6 by the restoring spring 8; as a result, the intermediate lever 13 is capable of following up the idling actuator adjustment of the throttle valve lever 24, counter to the damping action of the damper element 21.

Based on the idling position shown in the drawing, if the gas pedal 5 is now depressed, then the actuating lever 6 is rotated clockwise, counter to the force of the restoring spring 8. At the same time, via the tensed follow-up drawing spring 12, the intermediate lever 13 is likewise drawn in a followup manner in the clockwise direction, the movement of the intermediate lever 13 being damped to a variable extent by the damper element 21 because of the operational connection therebetween via the lever 18. With increasing actuation speed on the part of the actuating lever 6, the damping action increases as well. The curved path 16 of the cam disk 15 is designed such that when the intermediate lever 13 is adjusted out of the idling position in the opening direction of the throttle valve 2, a greater damping action is generated than when the intermediate lever 13 is adjusted out of a partial-load position in the opening direction of the throttle valve 2. The intermediate lever 13 moving clockwise engages the throttle valve lever 24 with the coupling stop 23 and pivots this lever 24 clockwise as well, so as to open the throttle valve 2.

The damped follow-up of the throttle valve 2, in the manner described when there is an abrupt actuation of the gas pedal 5, has the advantage that an abrupt increase in the fuel-air mixture and a consequent jerking increase in engine power are avoided. As a result of the separation of the intermediate lever 13 and the throttle valve lever 24, it is attained that the idling actuator 29, in order to regulate the idling rpm, does not have to work counter to the damping action of the damper element 21, but instead must overcome only the torque at the throttle valve lever 24 generated by the coupling spring 25. The end stop 10 prevents the actuation lever 6 from swinging back substantially beyond its idling position if the gas pedal 5 is abruptly released, and as a result only the force generated by the uncoupling spring 25 can act upon the idling actuator 29, while the remaining force is absorbed by the coupling stop 23.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An actuating device for a throttle valve rotatably supported in an intake tube of an internal combustion engine and intended for controlling an aspirated air quantity flowing therethrough comprising said throttle valve being connected to a throttle valve shaft and being actuatable in a damped manner via an actuating lever by a throttle control means, counter to a force applied by at least one restoring spring, said actuating lever being supported rotatably with respect to said throttle valve shaft and being arranged to engage an intermediate lever by means of a helically-embodied follow-up drawing spring, said intermediate lever being rotatably supported with respect to the throttle valve shaft to act upon a throttle valve lever connected to said throttle valve shaft, the intermediate lever being connected to a cam disk provided with a curved camming surface, rotational motion of said intermediate lever being damped by an associated damper element, said throttle valve lever being engaged by an electromagnetically actuatable idling actuator in an opening direction of the throttle valve, said throttle valve lever being connected to one end of at least one helically-embodied uncoupling spring, said uncoupling spring further secured at the other end to the intermediate lever, said throttle valve lever being drawn by said uncoupling spring against a coupling stop on the intermediate lever, whereby when the intermediate lever is adjusted out of the idling position in an opening direction of the throttle valve, a greater damping action is produced than when the intermediate lever is adjusted out of a partial-load position in the opening direction of the throttle valve.

2. The actuating device defined by claim 1, further wherein a moment of force exerted upon the intermediate lever by said at least one uncoupling spring is greater than a moment of force exerted upon the actuating lever by the restoring spring.

3. The actuating device defined by claim 1, further wherein the damper element is connected to a lever arm adapted to said curved camming surface of the cam disk attached to the intermediate lever, whereby a damping action can be applied to movement of said intermediate lever.

* * * * *